(12) United States Patent
Leigh et al.

(10) Patent No.: US 6,761,618 B1
(45) Date of Patent: Jul. 13, 2004

(54) DEFECT-FREE MAGNETIC STAMPERS/ IMPRINTERS FOR CONTACT PATTERNING OF MAGNETIC MEDIA

(75) Inventors: Joseph Leigh, Campbell, CA (US); Nobuo Kurataka, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/386,600

(22) Filed: Mar. 13, 2003

Related U.S. Application Data (60) Provisional application No. 60/392,900, filed on Jun. 28, 2002.

(51) Int. Cl.[7] .............................................. B24B 49/00
(52) U.S. Cl. .............................. 451/11; 451/6; 451/28; 451/296; 451/299; 451/301; 156/580; 156/581; 264/106; 264/107; 264/219; 264/220
(58) Field of Search ................................. 451/6, 11, 28, 451/296, 299, 301; 156/580, 581; 264/106, 107, 219, 220

(56) References Cited

U.S. PATENT DOCUMENTS 6,668,894 B2 * 12/2003 Jang et al. .................. 156/540

\* cited by examiner

*Primary Examiner*—Lee D. Wilson
*Assistant Examiner*—Shantese McDonald
(74) *Attorney, Agent, or Firm*—McDermott, Will & Emery LLP (57) ABSTRACT

A method of manufacturing a magnetic stamper/imprinter for use in patterning of magnetic recording media by means of a contact printing process, comprising sequential steps of:

(a) providing a stamper/imprinter comprising a body of a magnetic material having an imprinting surface including a topographical pattern corresponding to a pattern to be formed in the surface of a magnetic or magneto-optical (MO) recording medium and comprising a patterned plurality of spaced-apart recesses with a plurality of non-recessed areas therebetween, said imprinting surface including a plurality of defects comprising surface blemishes and stains, magnetic particles, and non-magnetic particles;

(b) initially removing the surface blemishes, stains, and magnetic particles; and (c) then removing or rendering the non-magnetic particles benign to the contact printing process.

20 Claims, 4 Drawing Sheets

Patterned Medium

DEFECT-FREE MAGNETIC STAMPERS/IMPRINTERS FOR CONTACT PATTERNING OF MAGNETIC MEDIA

CROSS-REFERENCE TO PROVISIONAL APPLICATION

This application claims priority from U.S. provisional patent application Serial No. 60/392,900 filed Jun. 28, 2002, the entire disclosure of which is incorporated herein by reference.

FIELD OF THE INVENTION

The present invention relates to methods of reliably manufacturing high quality magnetic stampers/imprinters utilized for performing rapid, cost-effective patterning of magnetic data/information storage and retrieval media. The invention has particular utility in the formation of servo patterns in the surfaces of magnetic recording layers of magnetic and magneto-optical (MO) recording media in the form of hard disks.

BACKGROUND OF THE INVENTION

Magnetic and magneto-optical (MO) recording media are widely used in various applications, e.g., in hard disk form, particularly in the computer industry, for storage and retrieval of large amounts of data/information. Typically such media require pattern formation in the major surface(s) thereof for facilitating operation, e.g., servo pattern formation for enabling positioning of the read/write transducer head over a particular data band or region.

Magnetic and magneto-optical (MO) recording media are conventionally fabricated in thin film form; the former are generally classified as "longitudinal" or "perpendicular", depending upon the orientation (i.e., parallel or perpendicular) of the magnetic domains of the grains of the magnetic material constituting the active magnetic recording layer, relative to the surface of the layer.

In operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped recording media, such as the above-described thin-film magnetic recording media, involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Figure 1:
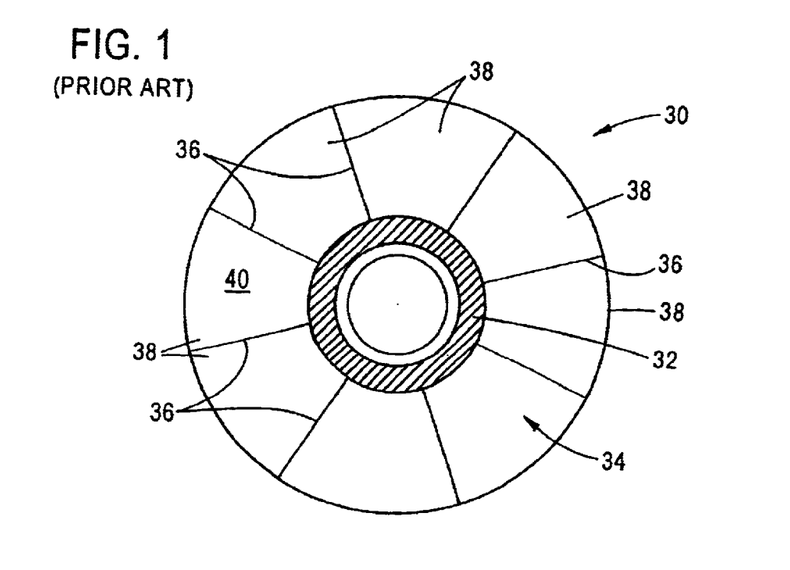
FIG. 1 illustrates in simplified, schematic plan view, a magnetic recording disk designating the data, servo pattern, and CSS zones thereof.

Adverting to FIG. 1, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 1 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned, co-pending U.S. patent application Ser. No. 10/082,178, filed Feb. 26, 2002, the entire disclosure of which is incorporated herein by reference, discloses a method and apparatus for reliably, rapidly, and cost-effectively forming very sharply defined magnetic transition patterns in a magnetic medium containing a longitudinal or perpendicular type magnetic recording layer without requiring expensive, complicated servo writing equipment/techniques incurring long processing intervals.

Specifically, the invention disclosed in U.S. patent application Ser. No. 10/082,178 is based upon recognition that a stamper/imprinter comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a contact "stamper/imprinter" for contact "imprinting" of a magnetic transition pattern, e.g., a servo pattern, in the surface of a magnetic recording layer of a magnetic medium ("workpiece"), whether of longitudinal or perpendicular type. A key feature of this invention is the use of a stamper/imprinter having an imprinting surface including a topographical pattern, i.e., comprised of projections and depressions corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electroforming techniques.

Figure 2:
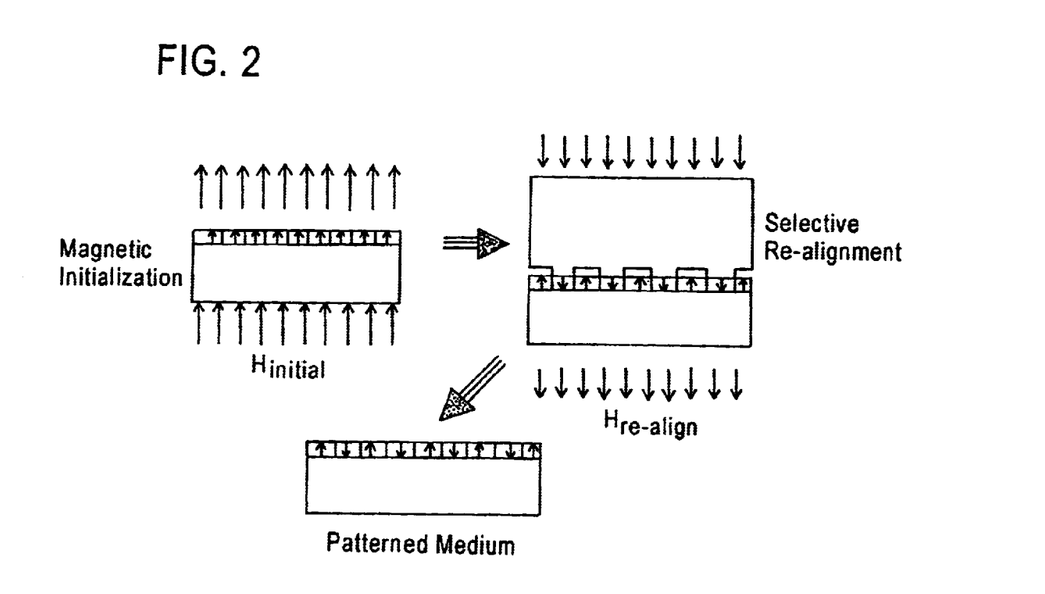
FIG. 2 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization, high permeability magnetic material having an imprinting surface with a surface topography corresponding to the desired magnetic transition pattern.
Figure 3:
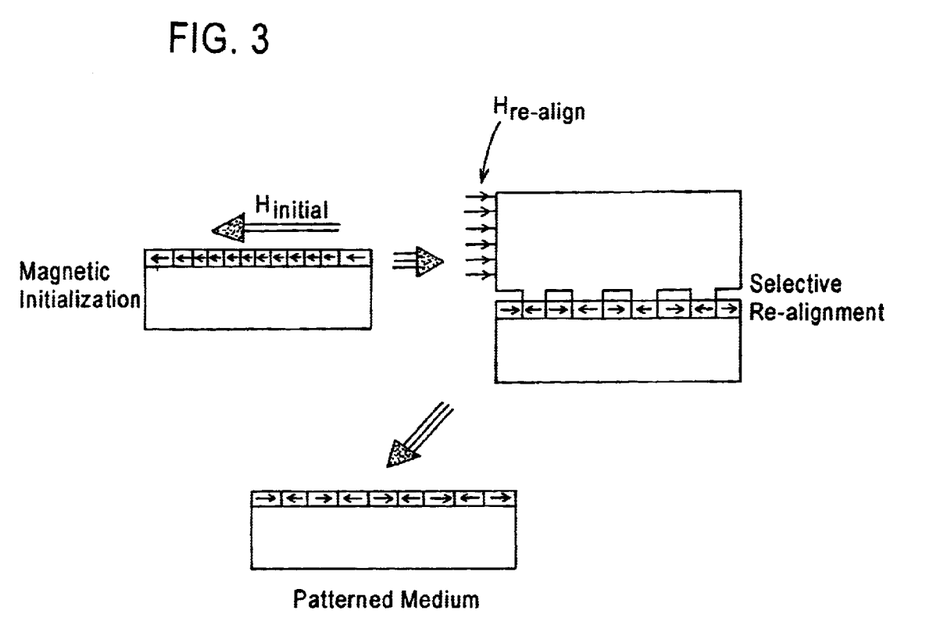
FIG. 3 illustrates, in schematic, simplified cross-sectional view, a similar sequence of process steps for contact printing a magnetic transition pattern in the surface of a longitudinal magnetic recording layer.

According to the invention, the magnetic domains of the magnetic recording layer of the workpiece are first unidirectionally aligned (i.e., "erased" or "initialized"), as by application of a first external, unidirectional magnetic field $H_{initial}$ of first direction and high strength greater than the saturation field of the magnetic recording layer, typically $\geq 2,000$ and up to about 20,000 Oe. The imprinting surface of the stamper/imprinter is then brought into intimate (i.e., touching) contact with the surface of the magnetic recording layer. With the assistance of a second externally applied magnetic field of second, opposite direction and lower but appropriate strength $H_{re-align}$, determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter (in the case of perpendicular recording media, as schematically illustrated in FIG. 2) or at the areas facing the depressions of the imprinting surface of the stamper/imprinter (in the case of longitudinal recording media, as schematically illustrated in FIG. 3) and the magnetic recording layer of the workpiece is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the workpiece to be patterned which essentially mimics the topographical pattern of projections and depressions of the imprinting surface. According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application, e.g., servo pattern formation in the recording layer of a disk-shaped, thin film, longitudinal or perpendicular magnetic recording medium comprise an imprinting surface having topographical features consisting of larger area data zones separated by smaller areas with well-defined patterns of projections and depressions corresponding to conventionally configured servo sectors, as for example, disclosed in commonly assigned U.S. Pat. No. 5,991,104, the entire disclosure of which is incorporated herein by reference. For example, a suitable topography for forming the servo sectors may comprise a plurality of projections (alt. depressions) having a height (alt. depth) in the range from about 100 to about 500 nm, a width in the range from about 50 to about 500 nm, and a spacing in the range from about 50 to about 500 nm.

Figure 4:
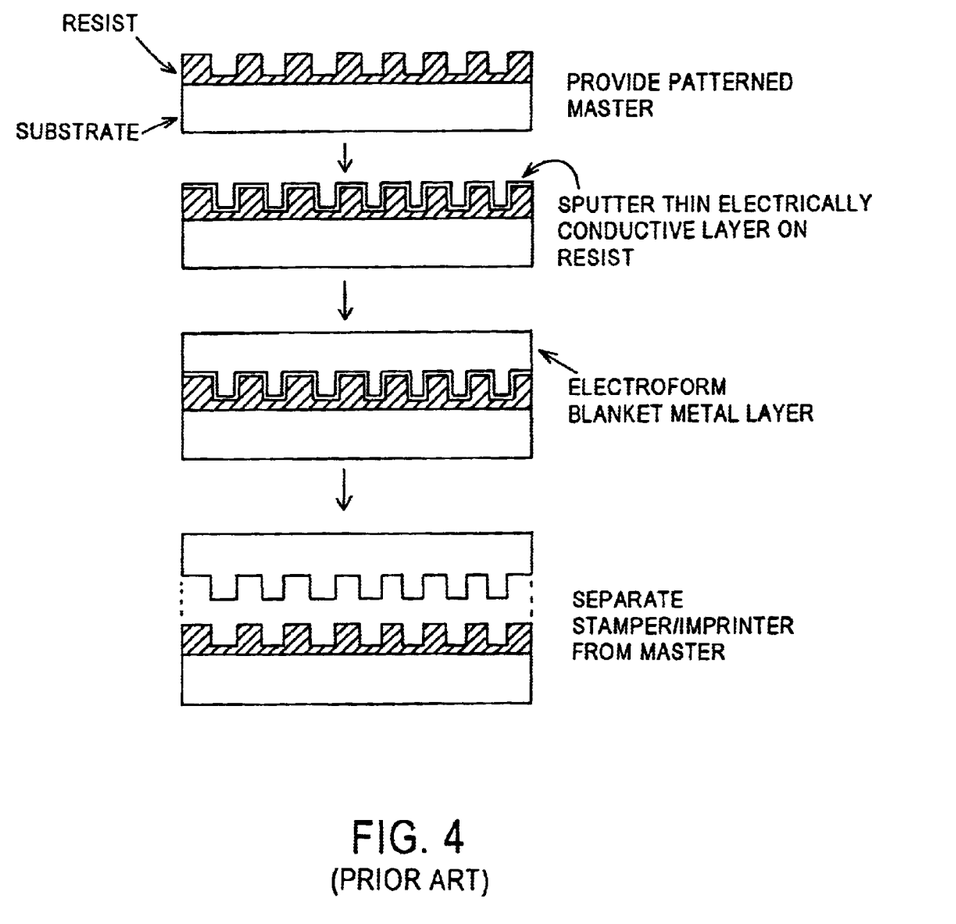
FIG. 4 schematically illustrates, in simplified cross-sectional view, a sequence of steps for forming a stamper/imprinter for recording media patterning, according to the conventional art.

According to conventional methodology, stampers/imprinters suitable for use in performing the foregoing patterning processes are manufactured by a sequence of steps as schematically illustrated in cross-sectional view in FIG. 4, which steps include providing a "master" comprised of a substantially rigid substrate with a patterned layer of a resist material thereon, the pattern comprising a plurality of projections and depressions corresponding (in positive or negative image form, as necessary) to the desired pattern to be formed in the surface of the stamper/imprinter. Stampers/imprinters are made from the "master" by initially forming a thin, conformal layer of an electrically conductive, magnetic material (e.g., Ni) over the patterned resist layer and then electroforming a substantially thicker ("blanket") magnetic layer (of the aforementioned magnetic metals and/or alloys) on the thin layer of electrically conductive material, which electroformed blanket layer replicates the surface topography of the resist layer. Upon completion of the electroforming process, the stamper/imprinter is separated from the "master", which is then re-used for making additional stampers/imprinters.

Typically, the above-described processes for manufacturing magnetic stampers/imprinters for contact printing (patterning) of magnetic and MO recording media result in the formation of imprinting surfaces having a number of defects, which defects must be completely removed prior to use of the stamper/imprinter for high replication quality contact printing. Such defects include surface blemishes and stains arising from manufacturing processing and submicron-sized particulate defects in the form of: (1) magnetic particles generated during the electroforming process for forming the blanket magnetic layer, and (2) non-magnetic particles, e.g., of non-magnetic metals and/or resist material derived from the "master" upon separation of the electroformed stamper/imprinter therefrom. Unfortunately, however, the submicron-sized particulate defects, particularly those composed of non-magnetic particles, frequently are highly electrically charged and therefore electrostatically cling to the imprinting surface, rendering their removal by conventional techniques very difficult.

In view of the above-described difficulty in effecting complete post-manufacture removal of submicron-sized particulate defects from imprinting surfaces of magnetic stampers/imprinters utilized in contact printing of magnetic patterns in magnetic and MO recording media via conventional techniques and methodologies, there exists a clear need for improved techniques and methodologies which enable complete removal of such particulate defects, or which at least render their presence benign.

The present invention, therefore, addresses and solves the aforementioned problems and difficulties associated with the complete removal of submicron-sized particulate defects formed on the imprinting surfaces of magnetic stampers/imprinters during manufacture thereof, while maintaining full compatibility with all other aspects of magnetic stamper/imprinter manufacture.

DISCLOSURE OF THE INVENTION

An advantage of the present invention is an improved method of manufacturing a magnetic stamper/imprinter for use in patterning of magnetic recording media by means of a contact printing process.

Another advantage of the present invention is an improved method of manufacturing a defect-free magnetic stamper/imprinter for use in patterning of magnetic recording media by means of a contact printing process.

Yet another advantage of the present invention is an improved method of manufacturing a magnetic stamper/imprinter for use in patterning of magnetic recording media by means of a contact printing process, wherein surface defects are rendered benign to the contact printing process.

Still another advantage of the present invention are improved, defect-free magnetic stampers/imprinters for use in contact printing of magnetic recording media.

A further advantage of the present invention are improved magnetic stampers/imprinters for use in contact printing of magnetic recording media, wherein surface defects are rendered benign to the contact printing process.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic stamper/imprinter for use in patterning of magnetic recording media by means of a contact printing process, comprising sequential steps of:

(a) providing a stamper/imprinter comprising a body of a magnetic material having an imprinting surface including a topographical pattern formed therein corresponding to a pattern to be formed in the surface of a magnetic or magneto-optical (MO) recording medium by the contact printing process and comprising a patterned plurality of spaced-apart recesses with a plurality of non-recessed areas therebetween, wherein the imprinting surface includes a plurality of defects comprising surface blemishes and stains, magnetic particles, and non-magnetic particles;

(b) initially removing the surface blemishes, stains, and magnetic particles; and (c) then removing or rendering the non-magnetic particles benign to the contact printing process.

According to preferred embodiments of the present invention, step (a) comprises providing a stamper/imprinter having an imprinting surface including a topographical pattern corresponding to a servo pattern to be formed in the surface of the magnetic or MO recording medium, i.e., a topographical pattern corresponding to a plurality of servo sector patterns to be formed in the surface of the magnetic or MO recording medium, each of the servo sectors of the topographical pattern comprised of a plurality of non-critical feature locations in the form of recesses having widths in the range from about 50 to about 500 nm and depths in the range from about 100 to about 500 nm and a plurality of critical feature locations in the form of non-recessed areas having widths in the range from about 50 to about 500 nm; wherein the non-magnetic and magnetic particles each have a maximum lateral dimension ranging from submicron-sizes up to about 1 $\mu$m; and step (b) comprises removing said surface blemishes, stains, and magnetic particles from said non-critical and critical feature locations of said imprinting surface.

In accordance with embodiments of the present invention, step (b) includes a preliminary step of determining the presence and location of the stains, blemishes, and magnetic particles on the imprinting surface, e.g., by means of an optical scanning technique; and step (b) comprises performing at least one treatment of the imprinting surface for removing the surface blemishes, stains, and magnetic particles from the non-critical and critical feature locations of the imprinting surface, e.g., step (b) comprises performing at least one fluid treatment of the imprinting surface.

According to particular/preferred embodiments of the present invention, step (c) comprises removing the non-magnetic particles from the critical feature locations of the imprinting surface, e.g., step (c) comprises performing tape buffing/burnishing of the critical feature locations, or step (c) comprises relocating the non-magnetic particles from the critical feature locations to the non-critical feature locations, e.g. step (c) comprises micro-scale removal of the non-magnetic particles from the critical feature locations, for example, by utilizing the tip of an Atomic Force Microscope (AFM) for removing the non-magnetic particles from the critical feature locations by electrostatically attracting the non-magnetic particles to the tip of the AFM, or by utilizing the AFM tip for relocating the non-magnetic particles from the critical feature locations to the non-critical feature locations.

According to further embodiments of the present invention, step (c) includes a preliminary step of determining the locations of the non-magnetic particles at the critical feature locations prior to removal therefrom, e.g., by means of an optical scanning technique.

Another aspect of the present invention are improved, defect-free magnetic stampers/imprinters manufactured according to the herein disclosed process.

Still another aspect of the present invention are improved magnetic stampers/imprinters manufactured according to the herein disclosed process, wherein particulate non-magnetic surface defects are rendered benign to the contact printing process.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention addresses and solves problems and difficulties attendant upon manufacture of magnetic stampers/imprinters for patterning of magnetic and magneto-optical (MO) recording media by conventional techniques, wherein the as-formed imprinting surface with topographical pattern therein includes a plurality of defects consisting of surface blemishes and stains, magnetic particles, and non-magnetic particles. Specifically, the present invention eliminates problems such as poor pattern replication fidelity arising from the presence of the above-enumerated defects at at least the critical feature locations of the topographically contoured imprinting surface, typically the non-recessed area portions intermediate the non-critical feature locations in the form of recesses or grooves.

Briefly stated, the present invention is based upon the discovery by the inventors that magnetic stampers/imprinters with defect-free or benign imprinting surfaces can be obtained by performing a two-step process for removal of the above-enumerated defect types, wherein the surface blemishes, stains, and magnetic particles are removed from the critical and non-critical feature locations of the topographically patterned imprinting surface in a first process, and the non-magnetic particles are removed from the critical feature locations in a second process, which second process may either involve complete removal of the non-magnetic particles from the imprinting surface or re-location to a location which is benign to the contact printing process, i.e., a non-critical feature location such as a recess or groove.

According to an initial step of the invention, a magnetic stamper/imprinter for use in patterning of magnetic or MO recording media is provided, as by conventional manufacturing techniques such as, for example, described above and illustrated in FIG. 4, wherein the stamper/imprinter comprises a body of a magnetic material having an imprinting surface including a topographical pattern formed therein corresponding to a pattern to be formed in the surface of the magnetic or MO recording medium by contact printing process, and comprises a patterned plurality of spaced-apart recesses with a plurality of non-recessed areas therebetween. As indicated above, the imprinting surface includes a plurality of defects arising from the manufacturing processing, consisting of surface blemishes and stains, magnetic particles, and non-magnetic particles, which defects must be removed or rendered benign prior to use of the stampers/imprinters in order to achieve high pattern replication fidelity.

More specifically, the defects include surface blemishes and stains arising from manufacturing processing and submicron-sized particulate defects in the form of: (1) magnetic particles generated during the electroforming process for forming the blanket magnetic layer, and (2) non-magnetic particles, e.g., of non-magnetic metals and/or resist material derived from the "master" upon separation of the electroformed stamper/imprinter therefrom. Unfortunately, however, the submicron-sized particulate defects, particularly those composed of non-magnetic particles, frequently are highly electrically charged and therefore electrostatically cling to the imprinting surface, rendering their removal by conventional techniques very difficult.

According to preferred embodiments of the present invention, a stamper/imprinter is provided as having an imprinting surface including a topographical pattern corresponding to a servo pattern to be formed in the surface of said magnetic or MO recording medium, which topographical pattern corresponds to a plurality of servo sector patterns to be formed in the surface of the magnetic or MO recording medium, each servo sector being comprised of a plurality of non-critical feature locations in the form of recesses having widths in the range from about 50 to about 500 nm and depths in the range from about 100 to about 500 nm, and a plurality of critical feature locations in the form of non-recessed areas having widths in the range from about 50 to about 500 nm. Typically, the non-magnetic and magnetic particles each have a maximum lateral dimension ranging from submicron-sizes up to about 1 $\mu$m.

The thus-provided stamper/imprinter with imprinting surface in its as-formed state is then subjected to a preliminary step for determining the presence and location of stains, blemishes, and magnetic particles on the imprinting surface, typically by means of a conventional optical scanning technique relying upon observation/measurement of phase differences of reflected radiation to identify and locate defects on the basis of differences in refractive index from the material of the stamper/imprinter surface. Upon completion of this preliminary step, at least one treatment (i.e., the first treatment) of the topographically patterned imprinting surface is performed for removing the stains, blemishes, and magnetic particles from the non-critical feature locations (i.e., recesses or grooves) as well as the critical feature locations (i.e., non-recessed areas). Typical treatments involve application of at least one fluid, e.g., an aqueous fluid, to the imprinting surface for dissolving the blemishes and stains and for flushing away the magnetic particles. Surface treatments suitable for use according to the present invention are similar to well-established cleaning techniques utilized in the manufacture of semiconductor devices and generally consist of a wet cleaning, as with the aid of an acidic etchant or a detergent, along with ultrasonic agitation of the cleaning bath to remove loosely adherent particles.

Following removal of the surface blemishes, stains, and magnetic particles in the first treatment process, the topographically patterned imprinting surface is subjected to the second treatment process for removing and/or re-locating the highly electrostatically charged non-magnetic particles from the critical feature locations to benign (or "safe") locations within the non-critical feature locations (the recesses or grooves), in view of the non-recessed areas of the topographical pattern being critical feature locations which will directly contact the surfaces of the magnetic recording media during patterning by contact printing, as described supra and illustrated in FIGS. 2–3.

Figure 5:
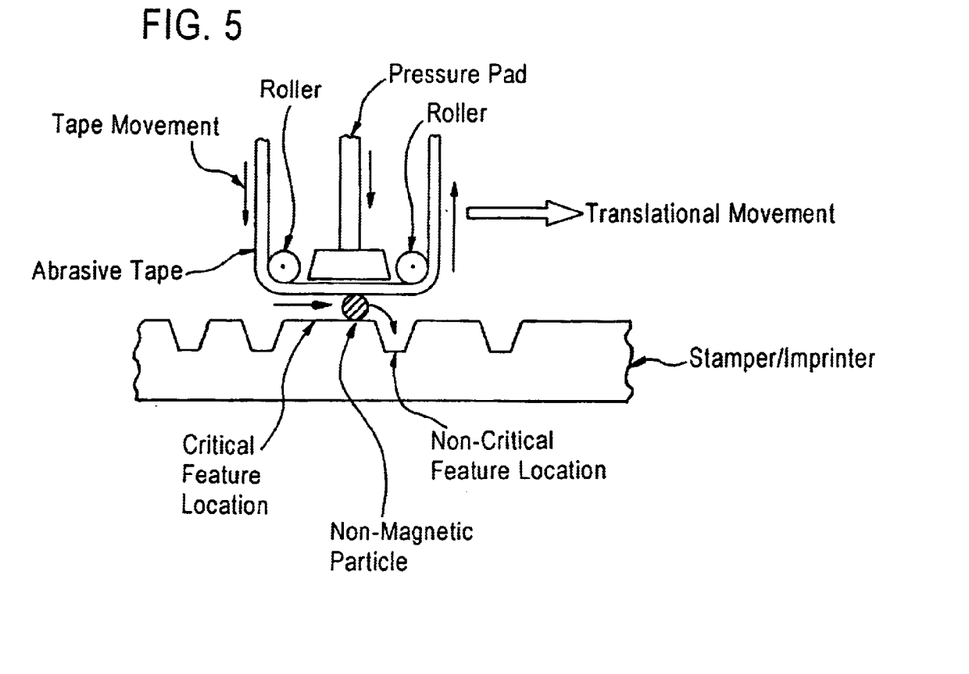
FIG. 5 schematically illustrates, in simplified cross-sectional view, a tape buffing/burnishing method for re-locating non-magnetic particles from non-recessed, critical feature locations to recessed, non-critical feature locations, according to an embodiment of the present invention.

According to an embodiment of the invention, schematically illustrated in simplified, cross-sectional view in FIG. 5, removal of the non-magnetic particles from the non-recessed, critical feature locations with simultaneous transfer to recessed, non-critical feature locations is accomplished by performing a tape buffing/burnishing process wherein a moving abrasive tape is guided between a pair of rollers and urged against the imprinting surface of the stamper/imprinter by means of a pressure-applying pad, with simultaneous translation of the moving abrasive tape over the imprinting surface. As illustrated in FIG. 5, non-magnetic particles on critical feature locations, i.e., non-recessed areas, and which have maximum lateral dimensions compatible with those of the recesses or grooves (i.e., equal or smaller lateral dimensions), are moved (i.e., re-located) by the moving tape to benign (or "safe") locations within the non-critical features, i.e., recesses and grooves. At the same time, non-magnetic particles on non-recessed, critical feature locations which have maximum lateral dimensions incompatible with those of the recesses or grooves (i.e., larger lateral dimensions) are removed entirely from the imprinting surface.

Figure 6:
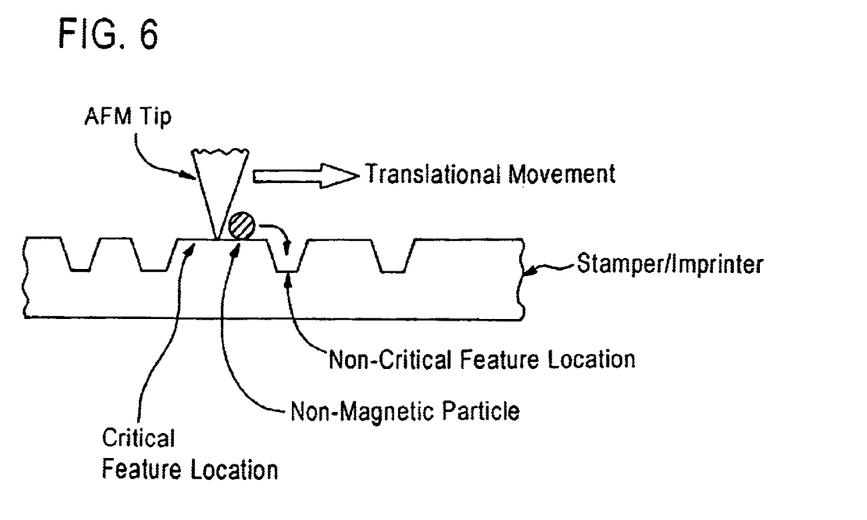
FIG. 6 schematically illustrates, in simplified cross-sectional view, an AFM tip-based micro-scale method for re-locating non-magnetic particles from non-recessed, critical feature locations to recessed, non-critical feature locations, according to another embodiment of the present invention.

According to another embodiment of the invention, schematically illustrated in simplified, cross-sectional view in FIG. 6, removal of the non-magnetic particles from the non-recessed, critical feature locations with simultaneous transfer to recessed, non-critical feature locations is accomplished by performing a micro-scale particle removal/transfer process. According to this embodiment, a preliminary step is performed for determining the presence and locations (coordinates) of non-magnetic particles at the non-recessed, critical feature locations, as by an optical scanning technique similar to that described supra for determining the presence and locations of stains, blemishes, and magnetic particles. Following this preliminary step, the tip of an Atomic Force Microscope (AFM) is directed to the coordinates of non-magnetic particles determined to be present at each critical feature location, and the non-magnetic particles removed entirely from the imprinting surface via electrostatic attraction to the AFM tip or by movement of the non-magnetic particles via the AFM tip to neighboring recessed, non-critical feature locations.

The present invention thus affords a number of advantages and improvements in manufacturing magnetic stampers/imprinters for contact printing of magnetic recording media, including servo patterning, which improvements include, inter alia, formation of defect-free or benign imprinting surfaces necessary for achieving high quality pattern replication.

It should be apparent to one of ordinary skill in the art that the present invention provides a significant improvement over the conventional art such as has been described above, particularly with respect to the ease and simplicity of manufacturing high replication fidelity stampers/imprinters with defect-free or benign imprinting surfaces for use in contact patterning of magnetic and MO recording media. Further, the imprinting surface of the stampers/imprinters according to the invention can be formed with a wide variety of topographical patterns, whereby the inventive methodology can be rapidly, easily, and cost-effectively implemented in the automated manufacture of a number of magnetic articles, devices, etc., requiring patterning, of which servo patterning of longitudinal and perpendicular magnetic recording media merely constitute examples of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of manufacturing a magnetic stamper/imprinter for use in patterning of magnetic recording media by means of a contact printing process, comprising sequential steps of:

(a) providing a stamper/imprinter comprising a body of a magnetic material having an imprinting surface including a topographical pattern formed therein corresponding to a pattern to be formed in the surface of a magnetic or magneto-optical (MO) recording medium by said contact printing process and comprising a patterned plurality of spaced-apart recesses with a plurality of non-recessed areas therebetween, wherein said imprinting surface includes a plurality of defects comprising surface blemishes and stains, magnetic particles, and non-magnetic particles;

(b) initially removing said surface blemishes, stains, and magnetic particles; and (c) then removing or rendering said non-magnetic particles benign to said contact printing process.

2. The method as in claim 1, wherein:

step (a) comprises providing a stamper/imprinter having an imprinting surface including a topographical pattern corresponding to a servo pattern to be formed in said surface of said magnetic or MO recording medium.

3. The method as in claim 2, wherein:

step (a) comprises providing a stamper/imprinter including a topographical pattern corresponding to a plurality of servo sector patterns to be formed in said surface of said magnetic or MO recording medium, each of said servo sectors of said topographical pattern comprised of a plurality of non-critical feature locations in the form of recesses having widths in the range from about 50 to about 500 nm and depths in the range from about 100 to about 500 nm and a plurality of critical feature locations in the form of non-recessed areas having widths in the range from about 50 to about 500 nm.

4. The method as in claim 3, wherein:

step (a) comprises providing a stamper/imprinter wherein said non-magnetic and said magnetic particles each have a maximum lateral dimension ranging from submicron-sizes up to about 1 μm.

5. The method as in claim 3, wherein:

step (b) comprises removing said surface blemishes, stains, and magnetic particles from said non-critical and critical feature locations of said imprinting surface.

6. The method as in claim 5, wherein:

step (b) includes a preliminary step of determining the presence and location of said stains, blemishes, and magnetic particles on said imprinting surface.

7. The method as in claim 6, wherein:

step (b) comprises performing said preliminary step of determining the presence and location of said stains, blemishes, and magnetic particles on said imprinting surface by means of an optical scanning technique.

8. The method as in claim 5, wherein:

step (b) comprises performing at least one treatment of said imprinting surface for removing said surface blemishes, stains, and magnetic particles from said non-critical and critical feature locations of said imprinting surface.

9. The method as in claim 8, wherein:

step (b) comprises performing at least one fluid treatment of said imprinting surface.

10. The method as in claim 3, wherein:

step (c) comprises removing said non-magnetic particles from said critical feature locations of said imprinting surface.

11. The method as in claim 10, wherein:

step (c) comprises performing tape buffing/burnishing of said critical feature locations.

12. The method as in claim 10, wherein:

step (c) comprises re-locating said non-magnetic particles from said critical feature locations to said non-critical feature locations.

13. The method as in claim 10, wherein:

step (c) comprises micro-scale removal of said non-magnetic particles from said critical feature locations.

14. The method as in claim 13, wherein:

step (c) comprises utilizing the tip of an Atomic Force Microscope (AFM) for removing said non-magnetic particles from said critical feature locations.

15. The method as in claim 14, wherein:

step (c) comprises electrostatically attracting said non-magnetic particles to said tip of said AFM.

16. The method as in claim 14, wherein:

step (c) comprises utilizing said AFM tip for re-locating said non-magnetic particles from said critical feature locations to said non-critical feature locations.

17. The method as in claim 13, wherein:

step (c) includes a preliminary step of determining the locations of said non-magnetic particles at said critical feature locations prior to removal therefrom.

18. The method as in claim 17, wherein:

step (c) includes a preliminary step of determining the locations of said non-magnetic particles at said critical feature locations by means of an optical scanning technique.

19. A magnetic stamper/imprinter manufactured according to the process of claim 3.

20. A magnetic stamper/imprinter manufactured according to the process of claim 1.

* * * * *